United States Patent
Lee et al.

(10) Patent No.: US 11,912,811 B2
(45) Date of Patent: Feb. 27, 2024

(54) CATALYST COMPOSITION, CLEANING LIQUID COMPOSITION CONTAINING THE SAME, AND METHOD OF CLEANING POLYMERIZATION APPARATUS USING THE CLEANING LIQUID COMPOSITION

(71) Applicant: LG Chem, Ltd., Seoul (KR)

(72) Inventors: Eun Gyeong Lee, Daejeon (KR); Hong Soo Lee, Daejeon (KR)

(73) Assignee: LG Chem, Ltd. (KR)

( * ) Notice: Subject to any disclaimer, the term of this patent is extended or adjusted under 35 U.S.C. 154(b) by 185 days.

(21) Appl. No.: 17/431,608

(22) PCT Filed: Nov. 9, 2020

(86) PCT No.: PCT/KR2020/015594
§ 371 (c)(1),
(2) Date: Aug. 17, 2021

(87) PCT Pub. No.: WO2021/206250
PCT Pub. Date: Oct. 14, 2021

(65) Prior Publication Data
US 2022/0162351 A1  May 26, 2022

(30) Foreign Application Priority Data
Apr. 7, 2020 (KR) .................. 10-2020-0041908

(51) Int. Cl.
| | | |
|---|---|---|
| C08F 4/60 | (2006.01) | |
| C08C 19/08 | (2006.01) | |
| C08F 2/00 | (2006.01) | |
| C08F 4/54 | (2006.01) | |
| C08F 236/10 | (2006.01) | |

(52) U.S. Cl.
CPC ............ *C08F 4/60* (2013.01); *C08F 2/008* (2013.01); *C08F 236/10* (2013.01)

(58) Field of Classification Search
CPC .. C08F 4/60; C08F 2/008; C08F 2/002; C08F 4/545; C08C 19/08
See application file for complete search history.

(56) References Cited

U.S. PATENT DOCUMENTS

| | | |
|---|---|---|
| 2009/0076226 A1 | 3/2009 | Meca et al. |
| 2010/0022789 A1 | 1/2010 | Mignani et al. |
| 2015/0232406 A1 | 8/2015 | Wagener et al. |
| 2016/0060386 A1 | 3/2016 | Medoff et al. |
| 2020/0362273 A1 | 11/2020 | Joe et al. |

FOREIGN PATENT DOCUMENTS

| | | |
|---|---|---|
| CN | 104610062 A | 5/2015 |
| CN | 110272534 A | 9/2019 |
| EP | 2280033 A1 | 2/2011 |
| KR | 20130129181 A | 11/2013 |
| KR | 20150024396 A | 3/2015 |
| KR | 20170077485 A | 7/2017 |
| KR | 20190049433 A | 5/2019 |

OTHER PUBLICATIONS

Search report from International Application No. PCT/KR2020/015594, dated Feb. 19, 2021.

*Primary Examiner* — Catherine S Branch
(74) *Attorney, Agent, or Firm* — Lerner David LLP

(57) ABSTRACT

The present invention relates to a catalyst composition containing: one or more selected from the group consisting of a transition metal compound represented by Formula 1 and a transition metal compound represented by Formula 3, and dialkyl L-tartrate; a cleaning liquid composition containing the catalyst composition; and a method of cleaning a polymerization apparatus using the cleaning liquid composition,

[Formula 1]

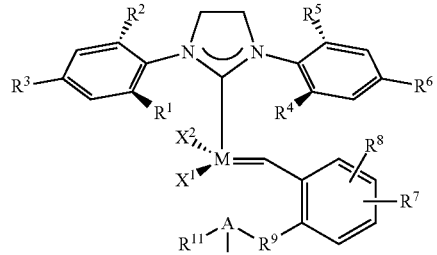

[Formula 3]

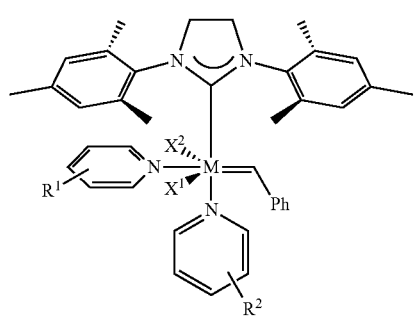

wherein all the variables are described herein.

14 Claims, No Drawings

CATALYST COMPOSITION, CLEANING LIQUID COMPOSITION CONTAINING THE SAME, AND METHOD OF CLEANING POLYMERIZATION APPARATUS USING THE CLEANING LIQUID COMPOSITION

CROSS-REFERENCE TO RELATED APPLICATIONS

The present application is a national stage entry under 35 U.S.C. § 371 of International Application No. PCT/KR2020/015594 filed on Nov. 9, 2020, which claims priority from Korean Patent Application No. 10-2020-0041908 filed Apr. 7, 2020, the disclosure of which is incorporated herein by reference.

TECHNICAL FIELD

The present invention relates to a catalyst composition, a cleaning liquid composition containing the catalyst composition, and a method of cleaning a polymerization apparatus in which a high molecular weight polymer is accumulated, using the cleaning liquid composition.

BACKGROUND ART

A solution polymerization method, which is easy to prepare a high-molecular weight polymer, is mainly used to polymerize a high molecular weight polymer from a diene-containing monomer. For example, the high molecular weight polymer such as solution styrene butadiene rubber (SSBR), butadiene rubber (BR), and styrene butadiene styrene block copolymer (SBS) is polymerized by using the solution polymerization method.

However, when the high molecular weight polymer is polymerized by using the solution polymerization method, the high molecular weight polymer is accumulated in a polymerization reactor, thereby lowering heat exchange efficiency in the polymerization reactor; polymerization in the polymerization reactor is lowered due to the accumulated high molecular weight polymer, thereby lowering productivity; and the accumulated polymer flows into the bottom of the polymerization reactor, thereby blocking the transfer of reactants.

Accordingly, in order to solve the problems described above, a jet-cleaning in which a person enters the reactor periodically, and physically removes the accumulated high molecular weight polymer using high pressure water is periodically performed. However, there are problems that an average of 5 days of removal time is required during the jet-cleaning, during which time all production facilities, including the polymerization reactor, are stopped, which has a huge impact on the productivity; there is always a possibility of a safety accident because a person directly enters the polymerization reactor; and water is used during the jet-cleaning, which requires an additional water removal process, etc. to restart solution polymerization, especially anionic polymerization, after the cleaning is completed. In order to solve these problems, as a method to remove the high molecular weight polymer accumulated in the polymerization reactor, a technology for removing the accumulated high molecular weight polymer in a chemical manner is being performed through an olefin cross metathesis method using a catalyst for olefin cross metathesis, instead of a physical method such as the jet-cleaning.

Meanwhile, polymerization of the high molecular weight polymer from the diene-containing monomer has been actively performed in a polymerization system using rare earth metal-containing catalysts. Among the rare earth metal-containing catalysts, a neodymium compound (Nd (OOCR)$_3$, where R=alkyl group) has been proven to be effective, and in particular, there is also a report that a catalyst system containing the neodymium compound and an organoaluminum compound may obtain a conjugated diene-based polymer having a high polymerization activity and a narrow molecular weight distribution.

However, there are problems that when a high molecular weight polymer containing diene is polymerized using a catalyst system containing the neodymium compound and the organoaluminum compound, the accumulated high molecular weight polymer and organoaluminum remain in the reactor, which act as a factor that inhibits the reaction of the catalyst for olefin cross metathesis when the reactor is cleaned using a catalyst for olefin cross metathesis, and thus, the removal efficiency of the high molecular weight polymer is lowered.

Accordingly, the present invention is intended to provide the catalyst composition capable of effectively removing the accumulated high molecular weight polymer and organoaluminum in the reactor for polymerizing the diene-based polymer using the catalyst system for polymerization containing the rare earth metal compound and the organoaluminum compound.

DISCLOSURE

Technical Problem

The present invention has been made in an effort to solve the problems described above, and an object of the present invention is to provide a catalyst composition capable of effectively removing an accumulated high molecular weight polymer and organoaluminum in a reactor for polymerizing a diene-based polymer using a catalyst system for polymerization containing a rare earth metal compound and an organoaluminum compound, and a method of cleaning a polymerization apparatus having excellent cleaning efficiency by using the cleaning liquid composition containing the same

Technical Solution

In one aspect, there is provided a catalyst composition containing: one or more selected from the group consisting of a transition metal compound represented by the following Formula 1 and a transition metal compound represented by the following Formula 3; and dialkyl L-tartrate:

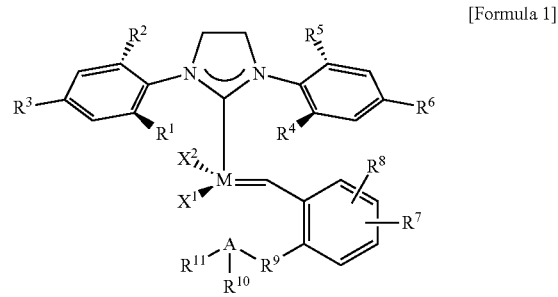

[Formula 1]

where M is ruthenium or osmium, A is oxygen (O), nitrogen (N), or sulfur (S), and if A is oxygen (O) or sulfur (S), any one of $R^{10}$ and $R^{11}$ does not exist, $X^1$ and $X^2$ are each independently halogen, $R^1$, $R^2$, $R^3$, $R^4$, $R^5$, and $R^6$ are each independently hydrogen or an alkyl group having 1 to 10 carbon atoms, $R^7$ and $R^8$ are each independently hydrogen or an electron withdrawing group, $R^9$ is a direct bond or an alkylene group having 1 to 10 carbon atoms, and $R^{10}$ and $R^{11}$ are each independently an alkyl group having 1 to 10 carbon atoms or a substituent represented by the following Formula 2,

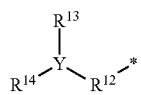

[Formula 2]

wherein Y is oxygen (O), nitrogen (N), or sulfur (S), and if Y is oxygen (O) or sulfur (S), any one of $R^{13}$ and $R^{14}$ does not exist, $R^{12}$ is an alkylene group having 1 to 10 carbon atoms, a cycloalkylene group having 3 to 10 carbon atoms, or an arylene group having 6 to 10 carbon atoms, $R^{13}$ and $R^{14}$ are each independently hydrogen, an alkyl group having 1 to 10 carbon atoms, or a cycloalkyl group having 3 to 10 carbon atoms, and * represents a bonding position with A,

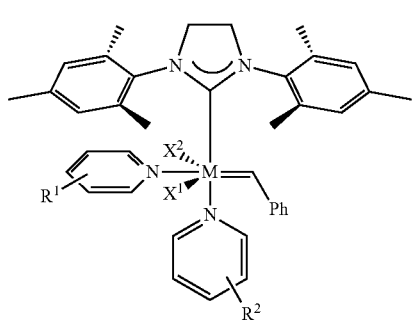

[Formula 3]

Wherein M is ruthenium or osmium, $R^1$ and $R^2$ are each independently hydrogen or a substituent represented by the following Formula 4, and at least one is a substituent represented by the following Formula 4, $X^1$ and $X^2$ are each independently halogen, and Ph is a phenyl group, and

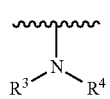

[Formula 4]

wherein $R^3$ and $R^4$ are each independently an alkyl group having 1 to 10 carbon atoms; or $R^3$ and $R^4$ are linked together, and with N to which they are attached to form a saturated or unsaturated 5-membered ring.

In another aspect, there is provided a method of cleaning a polymerization apparatus, including: step S30 of oligomerizing a diene-based polymer by injecting the catalyst composition according to the present invention into a polymerization apparatus containing the diene-based polymer.

Advantageous Effects

According to the present invention, it is possible to provide a catalyst composition capable of effectively removing an accumulated high molecular weight polymer and organoaluminum in a reactor for polymerizing a diene-based polymer using a catalyst system for polymerization containing a rare earth metal compound and an organoaluminum compound, and a method of cleaning a polymerization apparatus having excellent cleaning efficiency by using the cleaning liquid composition containing the same.

BEST MODE

The terms and words used in the detailed description and claims of the present invention should not be interpreted as being limited to conventional or dictionary meanings, but should be interpreted as having meanings and concepts meeting the technical ideas of the present invention based on a principle that the inventors can appropriately define the concepts of terms in order to describe their own inventions in the best mode.

Hereinafter, a "catalyst for olefin cross metathesis" used herein may refer to a catalyst for decomposing a high molecular weight polymer into a low molecular weight oligomer through olefin cross metathesis, a "catalyst composition" used herein may refer to a catalyst composition containing the catalyst for olefin cross metathesis (transition metal compound) and dialkyl L-tartrate, and a "catalyst system for polymerization containing a rare earth metal compound and an organoaluminum compound" used herein may refer to a catalyst system for polymerization for polymerizing a high molecular weight polymer containing a diene-based polymer from a diene-based monomer.

Hereinafter, the present invention will be described in more detail to assist in understanding the technical idea of the present invention.

The present invention provides a catalyst composition capable of chemically decomposing a high molecular weight polymer (e.g., a diene-based polymer). In detail, a catalyst composition according to the present invention may contain one or more selected from the group consisting of a transition metal compound represented by the following Formula 1 and a transition metal compound represented by the following Formula 3; and dialkyl L-tartrate:

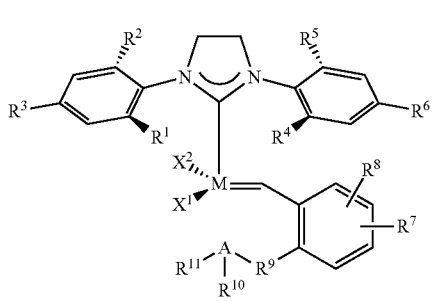

[Formula 1]

where is ruthenium or osmium, A is oxygen (O), nitrogen (N), or sulfur (S), and if A is oxygen (O) or sulfur (S), any one of $R^{10}$ and $R^{11}$ does not exist, $X^1$ and $X^2$ are each independently halogen, $R^1$, $R^2$, $R^3$, $R^4$, $R^5$, and $R^6$ are each independently hydrogen or an alkyl group having 1 to 10 carbon atoms, $R^7$ and $R^8$ are each independently hydrogen or an electron withdrawing group, $R^9$ is a direct bond or an alkylene group having 1 to 10 carbon atoms, and $R^{10}$ and $R^{11}$ are each independently an alkyl group having 1 to 10 carbon atoms or a substituent represented by the following Formula 2,

[Formula 2]

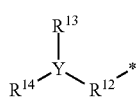

wherein Y is oxygen (O), nitrogen (N), or sulfur (S), and if Y is oxygen (O) or sulfur (S), any one of $R^{13}$ and $R^{14}$ does not exist, $R^{12}$ is an alkylene group having 1 to 10 carbon atoms, a cycloalkylene group having 3 to 10 carbon atoms, or an arylene group having 6 to 10 carbon atoms, $R^{13}$ and $R^{14}$ are each independently hydrogen, an alkyl group having 1 to 10 carbon atoms, or a cycloalkyl group having 3 to 10 carbon atoms, and * represents a bonding position with A,

[Formula 3]

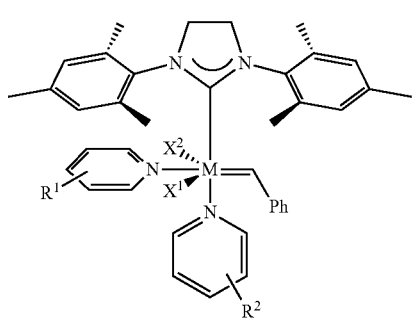

Wherein M is ruthenium or osmium, $R^1$ and $R^2$ are each independently hydrogen or a substituent represented by the following Formula 4 and at least one is a substituent represented by the following Formula 4, $X^1$ and $X^2$ are each independently halogen, and Ph is a phenyl group, and

[Formula 4]

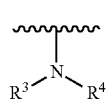

Wherein $R^3$ and $R^4$ are each independently an alkyl group having 1 to 10 carbon atoms; or $R^3$ and $R^4$ are linked together, and with N to which they are attached to form a saturated or unsaturated 5-membered ring.

Polymerization of a high molecular weight polymer from a diene-containing monomer has been performed by using a polymerization system using rare earth metal-containing catalysts. Among the rare earth metal-containing catalysts, a neodymium compound ($Nd(OOCR)_3$, where R=alkyl group) has been proven to be effective, and in particular, it has been reported that a catalyst system containing the neodymium compound and an organoaluminum compound as a cocatalyst may obtain a diene-based polymer having a high polymerization activity and a narrow molecular weight distribution.

However, there is a problem that when a high molecular weight diene-containing polymer is polymerized by using the catalyst system containing the neodymium compound and the organoaluminum compound, the accumulated high molecular weight polymer and organoaluminum remain in the reactor, which act as a factor that inhibits the reaction of the catalyst for olefin cross metathesis when the reactor is cleaned using the catalyst for olefin cross metathesis, and thus, the removal efficiency of the high molecular weight polymer is lowered.

Accordingly, in the present invention, it is possible to efficiently remove the accumulated high molecular weight diene-based polymer and organoaluminum in the reactor by including a dialkyl L-tartrate acting as a scavenger of organoaluminum in the catalyst composition.

The transition metal compound represented by Formula 1 or the transition metal compound represented by Formula 3 contained in the cleaning liquid composition according to an embodiment of the present invention, may be a transition metal compound for decomposing the high molecular weight polymer accumulated in the polymerization apparatus. A specific example of the transition metal compound may be a catalyst for decomposing a high molecular weight polymer into a low molecular weight oligomer by performing olefin cross metathesis of decomposing and recombining carbon-carbon double bond among the repeating units present in the high molecular weight polymer accumulated in the polymerization apparatus. When one or more selected from the group consisting of a transition metal compound represented by Formula 1 and a transition metal compound represented by Formula 3 are used as a catalyst for decomposition of a polymer, chemical stability is excellent; and cleaning efficiency is excellent and stable cleaning is possible when the polymerization apparatus is cleaned because there is little influence on functional groups and substituents other than the carbon-carbon double bonds among the repeating units present in the polymer.

Hereinafter, the functional groups or substituents described in the definitions of Formulas 1 to 4 will be described in detail.

The "hydrogen" may refer to a hydrogen atom or a hydrogen radical forming a covalent bond.

The "halogen" may refer to a halogen atom or a halogen ligand forming a coordination bond. Specifically, the halogen may be fluorine (F), chlorine (Cl), bromine (Br), or iodine (I).

The "alkyl group" may refer to a monovalent substituent derived from a linear or branched saturated hydrocarbon having 1 to 10 carbon atoms. Specifically, the alkyl group may be a methyl group, an ethyl group, a propyl group, an isopropyl group, a butyl group, an isobutyl group, an amyl group, an isoamyl group, or a hexyl group.

The "electron withdrawing group" may refer to a functional group that attracts electrons due to higher electronegativity than carbon (C). Specifically, the electron withdrawing group may be a hydrocarbon group to which nitrogen (N), oxygen (O), sulfur (S), halogen, etc. are bonded.

The "alkylene group" may refer to a divalent substituent derived from an aliphatic unsaturated hydrocarbon having 1 to 10 carbon atoms. Specifically, the alkylene group may be methylene, ethylene, propylene, butylene, amylene, or hexylene.

The "cycloalkyl group" may refer to a monovalent substituent derived from a monocyclic or polycyclic non-aromatic hydrocarbon having 3 to 10 carbon atoms. Specifically, the cycloalkyl group may be a cyclopropyl group, a cyclobutyl group, a cyclopentyl group, or a cyclohexyl group.

The "cycloalkylene group" may refer to a divalent substituent derived from a non-aromatic hydrocarbon having 3 to 10 carbon atoms. Specifically, the cycloalkylene group may be a cyclopropylene group, a cyclobutylene group, a cyclopentylene group, or a cyclohexylene group.

The "arylene group" may refer to a divalent substituent derived from an aromatic hydrocarbon having 6 to 10 carbon atoms to which single ring or two or more rings are bonded. Specifically, the arylene group may be a phenylene group or a naphthylene group.

The direct bond means that a connection is made by a bonding line because there is no atom or atomic group at the corresponding position.

The "saturated or unsaturated 5-membered ring" may mean a saturated or unsaturated cyclic group formed of five atoms including N atoms represented in Formula 4, the saturated cyclic group may mean that there are no double bonds in the ring, and the unsaturated cyclic group may mean that one or more double bonds exist in the ring. Here, in the saturated or unsaturated 5-membered ring, atoms forming the 5-membered ring may be all carbon atoms except for a nitrogen (N) atom represented in Formula 4. Alternately, the saturated or unsaturated 5-membered ring may further include one or more hetero atoms selected from the group consisting of an oxygen (O) atom, a nitrogen (N) atom, and a sulfur (S) atom in addition to a carbon atom. In addition, the saturated or unsaturated 5-membered ring may be unsubstituted or substituted by the substituent such as a monovalent hydrocarbon group or a monovalent hydrocarbon group containing a hetero atom.

Meanwhile, the functional groups or substituents described in the definitions of Formulas 1 to 4 may be unsubstituted or substituted by a hydrocarbon group having 1 to 10 carbon atoms.

According to an embodiment of the present invention, the transition metal compound represented by Formula 1 contains two or more hetero atoms (e.g., N, O, S, etc.) at a benzylidene group bonded to central metal (M), such that coordination bonding strength between the benzylidene group, which is a ligand, and the central metal (M), may be increased, thereby having excellent thermal stability.

According to an embodiment of the present invention, the transition metal compound represented by Formula 1 may be a transition metal compound represented by the following Formula 5. In this case, it is possible to stably activate an olefin cross metathesis reaction while minimizing the influence on functional groups and substituents other than the carbon-carbon double bonds among the repeating units present in the polymer.

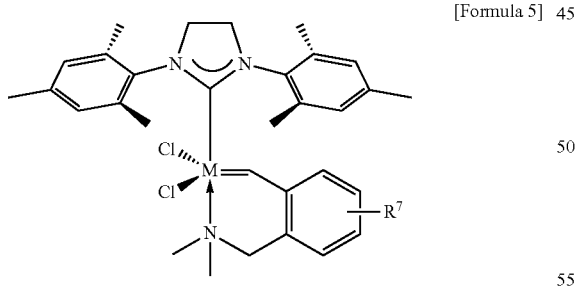

[Formula 5]

wherein M and $R^7$ are each as defined above.

According to an embodiment of the present invention, the transition metal compound represented by Formula 1 may be a transition metal compound represented by the following Formula 5. In addition, in this case, even if the transition metal compound is used as a catalyst in the olefin cross metathesis reaction of the high molecular weight polymer performed at high temperature (e.g., 86° C. or more), stable activity may be maintained during the reaction process, and reaction selectivity for the desired product may be obtained at the required level. Thus, when the high molecular weight polymer is metathesized using a catalyst composition containing a transition metal compound represented by the following Formula 5-1, it is possible to increase the efficiency of metathesis reaction of the high molecular weight polymer.

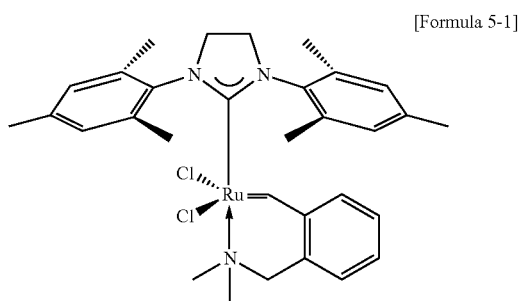

[Formula 5-1]

In addition, according to an embodiment of the present invention, the transition metal compound represented by Formula 3 may be a transition metal compound represented by the following Formula 6. In this case, the efficiency of olefin cross metathesis is excellent, such that the polymerization apparatus may be cleaned even with a smaller amount of the transition metal compound, stable cleaning is possible, and the time of the pretreatment step from completion of cleaning to restarting of polymerization may be reduced.

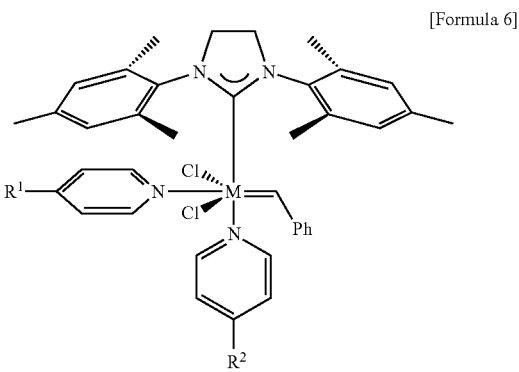

[Formula 6]

wherein M, $R^1$, and $R^2$ are each as defined above.

[Formula 4]

wherein $R^3$ and $R^4$ are each as defined above.

According to an embodiment of the present invention, the transition metal compound represented by Formula 3 may be a transition metal compound represented by the following Formula 6-1. In this case, an electron density of a central metal may be adjusted by changing the electron density at a nitrogen atom of an amino group, thereby adjusting cleaning capacity of the polymerization apparatus.

[Formula 6-1]

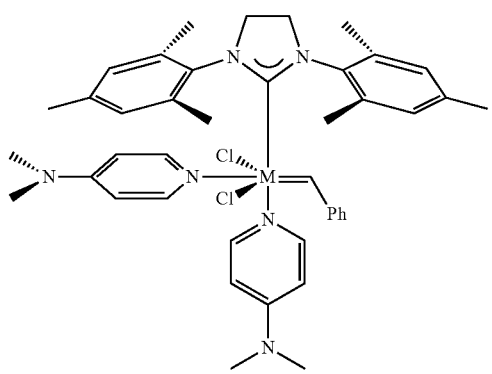

wherein M is ruthenium.

According to an embodiment of the present invention, the catalyst composition may contain two or more selected from the group consisting of the transition metal compound represented by Formula 1 and the transition metal compound represented by Formula 3. In this case, the reactivity of metathesis reaction may be improved by combination between two or more compounds. Specifically, if the catalyst composition contains two transition metal compounds, one transition metal compound is capable of metathesizing a polymer having a weight average molecular weight of several million into a polymer having a weight average molecular weight of hundreds of thousands, and the other transition metal compound is capable of metathesizing the metathesized polymer having a weight average molecular weight of hundreds of thousands into a polymer having a weight average molecular weight of thousands, thereby improving the reactivity of metathesis reaction.

According to an embodiment of the present invention, the catalyst composition according to the present invention may contain one or more selected from the group consisting of the transition metal compound represented by Formula 1 above and the transition metal compound represented by Formula 3; and dialkyl L-tartrate. Specific examples of the dialkyl L-tartrate may include one or more selected from the group consisting of dimethyl L-tartrate, diethyl L-tartrate, dipropyl L-tartrate, diisopropyl L-tartrate, dibutyl L-tartrate, and di-tert-butyl L-tartrate.

As described above, the dialkyl L-tartrate may act as a scavenger for organoaluminum. Specifically, the dialkyl L-tartrate may act as a bidentate ligand of the organoaluminum to remove the organoaluminum and protect the transition metal compound, thereby further improving the efficiency of the olefin cross metathesis reaction of the high molecular weight polymer by the transition metal compound. More specifically, the dialkyl L-tartrate may include one or more selected from the group consisting of diethyl L-tartrate and dibutyl L-tartrate. In this case, even if a smaller amount of the transition metal compound is included, the removal efficiency of the high molecular weight polymer accumulated in the reactor may be improved, and even if an excessive amount of dialkyl L-tartrate is included, the removal efficiency of the high molecular weight polymer may not be lowered.

The dialkyl L-tartrate may be included in an amount of 1 to 25 equivalents, 5 to 25 equivalents, or 10 to 20 equivalents, relative to 1 equivalent of one or more selected from the group consisting of the transition metal compound represented by Formula 1 and the transition metal compound represented by Formula 3. When dialkyl L-tartrate is included within the above range, it is easy to remove the organoaluminum and by-products, and the efficiency of the olefin cross metathesis is excellent even with a smaller amount of transition metal compounds, such that stable cleaning is possible, and the time of the pretreatment step from completion of cleaning to restarting of polymerization may be reduced.

According to an embodiment of the present invention, there is provided a method of cleaning a polymerization apparatus according to the present invention. The method of cleaning a polymerization apparatus may include: step S30 of oligomerizing a diene-based polymer by injecting the catalyst composition according to the present invention into a polymerization apparatus containing the diene-based polymer.

When the polymerization apparatus is cleaned by such a method of cleaning the polymerization apparatus, the high molecular weight polymer accumulated in the polymerization apparatus may be removed in a chemical manner. Thus, it is possible to clean in a short time without any safety problems that occur when a person directly enters the apparatus, such that the restarting time of the polymerization reactor may be shortened, thereby improving productivity.

According to an embodiment of the present invention, in the step S30, the cleaning liquid composition further containing a hydrocarbon-based solvent, in addition to the catalyst composition, may be injected so as to clean the high molecular weight polymer (e.g., diene-based polymer) accumulated in the polymerization apparatus in a chemical manner.

The catalyst composition contained in the cleaning liquid composition may serve to activate the decomposition of the high molecular weight polymer accumulated in the polymerization apparatus. Specifically, the transition metal compound represented by Formula 1 and the transition metal compound represented by Formula 3 contained in the catalyst composition may act as a catalyst in a process of decomposing a high molecular weight polymer into a low molecular weight oligomer through olefin cross metathesis of decomposing and recombining the carbon-carbon double bond among the repeating units present in the high molecular weight polymer.

Accordingly, when cleaning the polymerization apparatus in which the polymer having a high molecular weight is accumulated, with the cleaning liquid composition containing the catalyst composition, stable cleaning may be achieved while having excellent cleaning efficiency.

The content of the catalyst composition may be 0.1 to 10,000 ppm, 0.1 to 1,000 ppm, 0.1 to 100 ppm, or 1 to 10 ppm, based on the total content of the cleaning liquid composition. When the content of the catalyst composition is within the above range, the efficiency of the olefin cross metathesis reaction is increased, thereby increasing cleaning efficiency of the high molecular weight polymer in the polymerization apparatus.

The hydrocarbon-based solvent contained in the cleaning liquid composition may serve to dissolve or disperse the catalyst composition. That is, the cleaning liquid composition according to the present invention may be a cleaning liquid composition in the form of a solution in which the above-described transition metal compound is dissolved or dispersed in the hydrocarbon-based solvent.

Such a hydrocarbon-based solvent may be a hydrocarbon-based solvent used in the process of preparing a polymer by a solution polymerization method. Specifically, the hydrocarbon-based solvent may be an aromatic hydrocarbon-based solvent (e.g., benzene, toluene, ethylbenzene, xylene). When the hydrocarbon-based solvent is the aromatic hydrocarbon-based solvent, the above-described catalyst composition may be easily dissolved or dispersed. In addition, since the hydrocarbon-based solvent has the same as or similar properties to the hydrocarbon-based solvent used in the solution polymerization method, the solution polymerization may be smoothly performed even if some solvent (hydrocarbon-based solvent) remains in the polymerization apparatus after the cleaning is completed.

The cleaning liquid composition of the present invention may be prepared by preparing a catalyst composition according to the present invention and then mixing the catalyst composition with a hydrocarbon-based solvent.

The diene-based polymer accumulated in the polymerization apparatus may be a polymer or a copolymer including repeating units derived from a diene-based monomer. Specifically, the diene-based polymer may be one or more selected from the group consisting of a butadiene-based polymer (e.g., butadiene rubber), an isoprene-based polymer (e.g., isoprene rubber), a styrene-butadiene-based polymer (e.g., styrene-butadiene rubber), and a styrene-butadiene-styrene-based block copolymer. In addition, the diene-based polymer may have a weight average molecular weight of 30,000 g/mol to 100,000,000 g/mol, 50,000 g/mol to 80,000,000 g/mol, or 100,000 g/mol to 50,000,000 g/mol. The diene-based polymer may be accumulated (fixed) to a polymerization reactor (a wall or a bottom of the polymerization reactor), a stirrer, or a transfer line included in the polymerization apparatus.

In addition, the diene-based oligomer oligomerized by the cleaning method of the polymerization apparatus may have a weight average molecular weight of 100 g/mol to 10,000 g/mol, 100 g/mol to 8,000 g/mol, or 100 g/mol to 5,000 g/mol. Within this range, a larger amount of the diene-based polymer may be removed, such that the cleaning efficiency is high, and the diene-based oligomer may be easily discharged together with the solvent in the polymerization apparatus after the cleaning is completed.

Further, according to an embodiment of the present invention, the cleaning liquid composition may be injected so as to contain the transition metal compound contained in the cleaning liquid composition in an amount of 0.001 to 1 part by weight, 0.001 to 0.1 part by weight, 0.001 to 0.01 part by weight, or 0.001 to 0.005 pars by weight per 100 parts by weight of the diene-based polymer accumulated in the polymerization apparatus. Within this range, the efficiency of olefin cross metathesis is excellent, such that the polymerization apparatus may be cleaned even with a smaller amount of the transition metal compound, stable cleaning is possible, and the time of the pretreatment step from completion of cleaning to restarting of polymerization may be reduced.

According to an embodiment of the present invention, the method of cleaning the polymerization apparatus, may further perform, before the step S30, step S20 of swelling the diene-based polymer in the polymerization apparatus with the hydrocarbon-based solvent in order to improve the accessibility of the transition metal compound contained in the cleaning liquid composition by swelling the diene-based polymer accumulated in the polymerization apparatus with the hydrocarbon-based solvent. Here, the hydrocarbon-based solvent may be an aliphatic hydrocarbon-based solvent (e.g., normal hexane, cyclohexane) or an aromatic hydrocarbon-based solvent (e.g., benzene, toluene, ethylbenzene, xylene).

Meanwhile, the swelling step S20 may be a step for improving the accessibility of the transition metal compound in the cleaning liquid composition by swelling the diene-based polymers accumulated in the polymerization apparatus, that is, fixed to the polymerization apparatus including the wall of the polymerization apparatus or stirring apparatus, with the hydrocarbon-based solvent. In the swelling step, the swelling may be performed at 20° C. to 100° C., or 20° C. to 80° C., and within the above range, the swelling of the diene-based polymer accumulated in the polymerization apparatus may be maximized.

According to an embodiment of the present invention, the method of cleaning the polymerization apparatus may further perform, before the step S20 or the step S30, step S10 of polymerizing the diene-based polymer in the presence of a catalyst system for polymerization containing a rare earth metal compound and an organoaluminum compound in the polymerization apparatus. The organoaluminium compound may be a cocatalyst of the rare earth metal compound used as a catalyst for diene-based polymerization.

The rare earth metal compound may include one or more selected from the group consisting of neodymium (Nd), lanthanum (La), and praseodymium (Pr), and specific examples of the rare earth metal compound may include neodymium. In addition, the organoaluminum may be trialkyl aluminum or a hydride thereof. Specific examples of the organoaluminum may include one or more selected from the group consisting of diethylaluminum, di-n-propylaluminum, diisopropylaluminum, di-n-butylaluminum, diisobutylaluminum, di-n-octylaluminum, diphenylaluminum, di-p-tolylaluminum, dibenzyl aluminum, phenylethyl aluminum, phenyl-n-propylaluminum, phenylisopropylaluminum, phenyl-n-butylaluminum, phenylisobutylaluminum, phenyl-n-octyl aluminum, p-tolylethyl aluminum, p-tolyl-n-propylaluminum, p-tolylisopropylaluminum, p-tolyl-n-butylaluminum, p-tolyl isobutylaluminum, p-tolyl-n-octyl aluminum, benzyl ethyl aluminum, benzyl-n-propyl aluminum, benzyl isopropyl aluminum, benzyl-n-butylaluminum, benzylisobutylaluminum, benzyl-n-octyl aluminum, ethyl aluminum, n-propyl aluminum, isopropyl aluminum, n-butyl aluminum, isobutyl aluminum, and n-octyl aluminum, or a hydride thereof.

As described above, the catalyst composition according to the present invention may contain one or more selected from the group consisting of transition metal compounds of Formulas 1 and 3, and the dialkyl L-tartrate. Thus, primarily, the removal efficiency of the organoaluminum may be excellent and secondly, the efficiency of olefin cross metathesis is increased by protecting the transition metal compound by the removal of the organoaluminum, and thus the removal efficiency of the diene-based polymer in the polymerization apparatus may be improved even if a smaller amount of the transition metal compound is used. Accordingly, stable cleaning of the polymerization apparatus is possible, and the time of the pretreatment step from completion of cleaning to restarting of polymerization may be reduced.

This method of cleaning the polymerization apparatus according to the present invention may remove a high molecular weight diene-based polymer polymerized in the presence of a catalyst system for polymerization containing a rare earth metal compound and an organoaluminum compound in a short time with an excellent removal rate, thereby increasing productivity and cleaning efficiency of the polymerization apparatus.

According to an embodiment of the present invention, the step S30 may be a step of performing the olefin cross-metathesis of the diene-based polymer with the catalyst composition (or a composition for cleaning) in order to oligomerize the swollen diene-based polymer. Specifically, the step S30 may be a step of performing the olefin cross metathesis of decomposing and recombining the carbon-carbon double bond (C—C double bond) among repeating units present in the diene-based polymer, where the catalyst composition may serve as a catalyst in the process of decomposing a high molecular weight diene-based polymer into a low molecular weight oligomer.

The oligomerization of the diene-based polymer in the step S30 may be performed at a temperature of 60° C. or more, 80° C. or more, or 80° C. to 150° C. In addition, the oligomerization of the diene-based polymer in the step S30 may be performed for 1 hour to 24 hours, 6 hours to 18 hours, or 12 hours to 15 hours. When the oligomerization of the diene-based polymer is performed within the range of the temperature and the time, the oligomerization of the diene-based polymer may be smoothly performed by the transition metal compound contained in the catalyst composition (or cleaning liquid composition), and the diene-based polymer may be oligomerized while minimizing the formation of incidental sediments.

Meanwhile, according to an embodiment of the present invention, in the step S30, one or more monomers selected from the group consisting of an olefin-based monomer, a conjugated diene-based monomer, and an aromatic vinyl-based monomer may be further injected to perform oligomerization of the diene-based polymer. In order to perform the oligomerization of the diene-based polymer through the olefin cross-metathesis reaction, it may be necessary to inject a separate monomer including the carbon-carbon double bond such as an alkene group, in addition to the carbon-carbon double bond present in the diene-based polymer. Accordingly, in the step S30, one or more monomers selected from the group consisting of an olefin-based monomer, a conjugated diene-based monomer, and an aromatic vinyl-based monomer may be injected together with the catalyst composition.

Specifically, the olefin-based monomer is an olefin-based monomer having two or more carbon atoms, and may be one or more selected from the group consisting of ethene, propene, butene, pentene, hexene, heptene, octene, nonene, and decene.

In addition, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1, 3-butadiene (where halo means a halogen atom).

The aromatic vinyl-based monomer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

According to an embodiment of the present invention, one or more monomers selected from the group consisting of the olefin-based monomer, the conjugated diene-based monomer, and the aromatic vinyl-based monomer be injected to have an equivalent weight of 1 ml to 100 ml, 5 ml to 50 ml, or 5 ml to 30 ml per 100 g of the diene-based polymer accumulated in the polymerization apparatus. When the monomer is injected within the above range, the oligomerization of the diene-based polymer may be smoothly performed.

The diene-based oligomer exists in a dissolved state in a first hydrocarbon-based solvent of the cleaning liquid composition, and may be discharged together when the cleaning liquid composition is discharged from the polymerization apparatus. A mixture of the cleaning liquid composition and the diene-based oligomer discharged from the polymerization apparatus may be transferred to a separate separation device and a distillation device to undergo separation and stripping processes.

Hereinafter, the present invention will be described in detail with reference to the following examples. However, the following examples are intended to be purely exemplary of the invention. It is apparent to those skilled in the art that various changes and modifications can be made within the scope and spirit of the present invention and that the present invention is not limited thereto.

EXAMPLES

Preparation Example 1

In a nitrogen filled glove box, 10 g of a compound represented by the following Formula 7 and 1.16 g of CuCl were injected into a 500 ml round bottom flask and a magnetic bar was added thereto. The flask was sealed with a rubber septum and taken out of the glove box, and then 195 ml of purified $CH_2Cl_2$ was added using a syringe under nitrogen gas. 2.06 g of N,N'-dimethyl-1-(2-vinylphenyl) methanamine was injected into a 20 ml vial, the vial was sealed with a silicone septum, and then a solution dissolved by adding purified $CH_2Cl_2$ using a syringe under nitrogen gas was added to the previously prepared mixture. After addition, N,N'-dimethyl-1-(2-vinylphenyl) methanamine remaining in the vial was all injected into a catalytic reaction vessel using 2×1 ml of $CH_2Cl_2$, respectively. A reflux condenser was installed in a 500 ml round bottom flask reaction vessel, and the temperature was raised to 40° C., followed by stirring under nitrogen gas for 3 hours. After the reaction, the temperature was lowered to room temperature, the magnetic bar was removed, and the solvent was removed by distillation under reduced pressure. The solvent was removed by distillation under reduced pressure, a small amount of $CH_2Cl_2$ capable of dissolving the remaining reaction mixture was injected into the flask, the solid was completely dissolved, and then normal hexane was added in an amount of about 1.5 times that of $CH_2Cl_2$. The reaction mixture was filtered through celite using normal hexane to remove a white solid precipitate to obtain a light green filtrate. The green filtrate was dried under reduced pressure to obtain a dark green solid, which was purified by a silica column to obtain a green compound represented by the following Formula 5-1 in a yield of 75%. 1H NMR for the synthesized compound was measured by dissolving in $CDCl_3$ using a Varian Mercury 500 at 499.85 MHz.

[Formula 7]

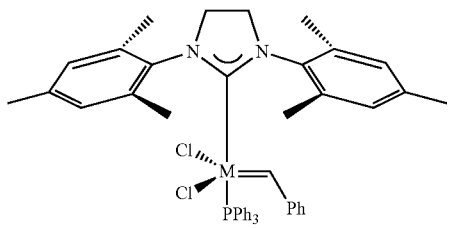

wherein M is ruthenium.

[Formula 5-1]

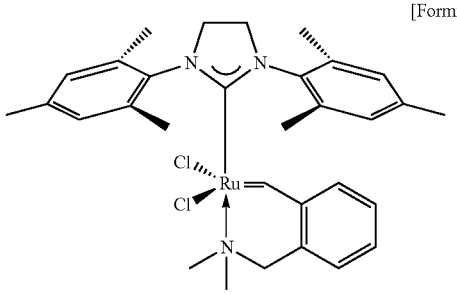

$^1$H NMR (CDCl3, 500 MHz) δ 18.72 (s, 1H), 7.46 (broad s, 1H), 7.12 (broad s, 1H), 7.03 (broad s, 4H), 6.93 (broad s, 1H), 6.75 (broad s, 1H), 4.18 (broad s, 6H), 2.8-2.2 (18H), 1.94 (broad s, 6H).

Preparation Example 2

In a 250 ml flask, 11.8 g of a compound represented by the following Formula 8 was added to 100 ml of toluene, followed by stirring for 1 hour. 20 g of a compound represented by the following Formula 7 was added to the stirred solution, followed by stirring at room temperature for 3 hours. After stirring, when the reaction solution in the flask changed from red to light green, normal hexane was added to precipitate a light green compound. The precipitated compound was filtered and dried under reduced pressure to obtain a transition metal compound represented by the following Formula 6-1 in which the compound represented by the following Formula 8 was coordinated with the ruthenium represented by the following Formula 7, in a yield of 92%. 1H NMR for the synthesized compound was measured by dissolving in CDCl$_3$ using a Varian Mercury 500 at 499.85 MHz.

[Formula 7]

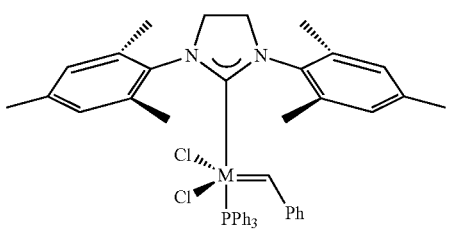

wherein M is ruthenium and Ph is a phenyl group.

[Formula 8]

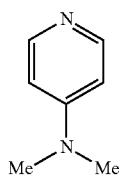

[Formula 6-1]

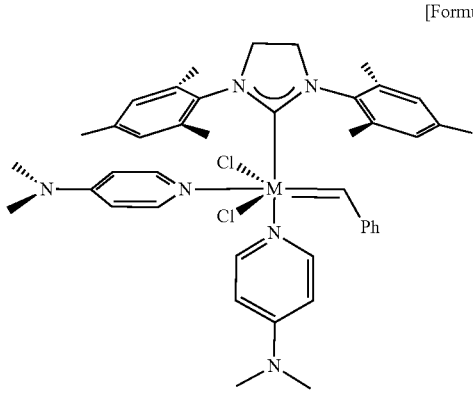

wherein M is ruthenium.

$^1$H NMR (CDCl$_3$, 500 MHz) δ 19.10 (s, 1H), 8.18 (d, 2H), 7.64 (d, 2H), 7.48 (t, 11H), 7.38 (d, 2H), 7.08 (t, 2H), 7.00 (broad s, 2H), 6.77 (broad s, 2H), 6.49 (d, 2H), 6.15 (d, 2H), 4.07 (broad d, 4H), 2.98 (s, 6H), 2.88 (s, 6H), 2.61-2.21 (18H).

Example 1

5 g of naturally cured polybutadiene rubber (MV: 123 MU) and 100 g of normal hexane were injected into a 250 ml of Andrew glass, respectively, to swell butadiene rubber. In a glove box, 0.75 ml of a catalyst for polymerization containing 0.2 mg (mass concentration 2 ppm) of the transition metal compound represented by Formula 5-1 in Preparation Example 1 dissolved in ethylbenzene, 0.45 μM neodymium and an organoaluminum compound, 1.0 ml of a styrene monomer, and 20 equivalents of diethyl L-tartrate as an organic aluminum scavenger, relative to 1 equivalent of the transition metal compound were sequentially injected into the Andrew glass, respectively. Then, the Andrew glass was stirred in a constant temperature bath at 80° C. for a predetermined time, respectively. Thereafter, the pressure in the Andrew glass was removed, and the solution in the Andrew glass was filtered through a mesh to recover the rubber.

Example 2

Example 2 was performed in the same manner as in Example 1, except that 10 equivalents of diethyl L-tartrate was added instead of 20 equivalents in Example 1.

Example 3

Example 3 was performed in the same manner as in Example 1, except that 5 equivalents of diethyl L-tartrate was added instead of 20 equivalents in Example 1.

Example 4

Example 4 was performed in the same manner as in Example 1, except that 3 equivalents of diethyl L-tartrate was added instead of 20 equivalents in Example 1.

Example 5

Example 5 was performed in the same manner as in Example 1, except that dibutyl L-tartrate was added instead of diethyl L-tartrate as an organoaluminum scavenger in Example 1.

Example 6

Example 6 was performed in the same manner as in Example 1, except that 10 equivalents of dibutyl L-tartrate was added instead of 20 equivalents in Example 5.

Example 7

Example 7 was performed in the same manner as in Example 1, except that 5 equivalents of dibutyl L-tartrate was added instead of 20 equivalents in Example 5.

Example 8

Example 8 was performed in the same manner as in Example 1, except that dipropyl L-tartrate was added instead of diethyl L-tartrate as an organoaluminum scavenger in Example 1.

Example 9

Example 9 was performed in the same manner as in Example 1, except that 10 equivalents of dipropyl L-tartrate was added instead of 20 equivalents in Example 8.

Example 10

Example 10 was performed in the same manner as in Example 1, except that the transition metal compound represented by Formula 6-1 was added instead of the transition metal compound represented by Formula 5-1 in Example 1.

Comparative Example 1

Comparative Example 1 was performed in the same manner as in Example 1, except that a catalyst for polymerization containing neodymium and an organoaluminum compound and diethyl L-tartrate as an organoaluminum scavenger, were not added in Example 1.

Comparative Example 2

Comparative Example 2 was performed in the same manner as that in Example 1, except that diethyl L-tartrate as the organoaluminum scavenger was not added in Example 1.

Comparative Example 3

Comparative Example 3 was performed in the same manner as in Example 1, except that 20 ppm of the transition metal compound represented by Formula 5-1 was added instead of 2 ppm in Comparative Example 2.

Comparative Example 4

Comparative Example 4 was performed in the same manner as in Example 1, except that 20 ppm of the transition metal compound represented by Formula 7 used in Preparation Example 1 was added instead of diethyl L-tartrate as the organoaluminum scavenger in Example 1.

Comparative Example 5

Comparative Example 5 was performed in the same manner as in Example 1, except that 20 ppm of the transition metal compound represented by Formula 6-1 was added instead of diethyl L-tartrate as the organoaluminum scavenger in Example 1.

Comparative Example 6

Comparative Example 6 was performed in the same manner as that in Example 1, except that acrylic acid was added instead of diethyl L-tartrate as the organoaluminum scavenger in Example 1.

Experimental Examples

Experimental Example 1

The cleaning efficiency (cleaning rate) was confirmed by drying the butadiene rubber recovered from the Examples and Comparative Examples under reduced pressure in a vacuum oven at 80° C. for 12 hours, measuring the weight of the butadiene rubber, and then calculating rubber removal rate (%) compared with the weight of initially introduced butadiene rubber. At this time, it can be seen that the higher the amount of cleaned (removed) butadiene rubber, that is, the smaller the amount of butadiene rubber filtered by the mesh, the higher the rubber removal rate (%).

TABLE 1

| | Compound of Formula 5-1 | Compound of Formula 6-1 | Catalyst for polymerization containing neodymium and organoaluminum compound | Scavenger Type | Content | Rubber removal rate (%) |
|---|---|---|---|---|---|---|
| Comp. Example 1 | 2 ppm | — | — | — | — | 91 |
| Comp. Example 2 | 2 ppm | — | 0.75 ml | — | — | 6 |
| Comp. Example 3 | 20 ppm | — | 0.75 ml | — | — | 80 |
| Comp. Example 4 | 2 ppm | — | 0.75 ml | Compound of Formula 7 | 20 ppm | 23 |
| Comp. Example 5 | 2 ppm | — | 0.75 ml | Compound of Formula 6-1 | 20 ppm | 63 |
| Comp. Example 6 | 2 ppm | — | 0.75 ml | Acrylic acid | 20 eq. | 6 |
| Example 1 | 2 ppm | — | 0.75 ml | Diethyl L-tartrate | 20 eq. | 97 |

TABLE 1-continued

|  | Compound of Formula 5-1 | Compound of Formula 6-1 | Catalyst for polymerization containing neodymium and organoaluminum compound | Scavenger Type | Content | Rubber removal rate (%) |
|---|---|---|---|---|---|---|
| Example 2 | 2 ppm | — | 0.75 ml | Diethyl L-tartrate | 10 eq. | 96 |
| Example 3 | 2 ppm | — | 0.75 ml | Diethyl L-tartrate | 5 eq. | 81 |
| Example 4 | 2 ppm | — | 0.75 ml | Diethyl L-tartrate | 3 eq. | 62 |
| Example 5 | 2 ppm | — | 0.75 ml | Dibutyl L-tartrate | 20 eq. | 95 |
| Example 6 | 2 ppm | — | 0.75 ml | Dibutyl L-tartrate | 10 eq. | 88 |
| Example 7 | 2 ppm | — | 0.75 ml | Dibutyl L-tartrate | 5 eq. | 85 |
| Example 8 | 2 ppm | — | 0.75 ml | Dipropyl L-tartrate | 20 eq. | 81 |
| Example 9 | 2 ppm | — | 0.75 ml | Dipropyl L-tartrate | 10 eq. | 78 |
| Example 10 | — | 2 ppm | 0.75 ml | Diethyl L-tartrate | 20 eq. | 95 |

It can be confirmed from Table 1 that Examples 1 to 10, in which the transition metal compound represented by Formula 5-1 according to the present invention or the transition metal compound represented by Formula 6-1 according to the present invention was added together with dialkyl L-tartrate, had excellent rubber removal rate.

Meanwhile, it can be confirmed that when the catalyst for polymerization containing the neodymium and the organoaluminum compound was not added (Comparative Example 1), the rubber removal rate only with the use of the transition metal compound represented by Formula 5-1 was 91%, which was excellent, but when the catalyst for polymerization containing the neodymium and the organoaluminum compound was added (Comparative Example 2), the rubber removal rate only with the use of the transition metal compound represented by Formula 5-1 was 6%, which was significantly lowered. In addition, it could be confirmed that Comparative Example 3, in which the content of the transition metal compound represented by Formula 5-1 was increased to 20 ppm, had an improved rubber removal rate compared with Comparative Example 2 in which a small amount (2 ppm) of the transition metal compound was added.

This could indicate that the organoaluminum contained in the catalyst for polymerization used in the manufacture of the high molecular weight diene-based polymer interferes with the olefin cross metathesis reaction of the transition metal compound, such that it is difficult to remove the accumulation by a chemical rubber removal method using a small amount of the transition metal compound.

On the other hand, Examples 1 to 10 showed that the rubber removal rate was significantly better than that of Comparative Example 2 even when a small amount (2 ppm) of the compound represented by Formula 5-1 or Formula 6-1 was used by the injection of the scavenger, and further, the rubber removal rate was equal to or higher than that of Comparative Example 3.

In addition, it can be confirmed that Comparative Examples 4 to 6 in which the transition metal compound represented by Formula 7, the transition metal compound represented by Formula 6-1, or an acrylic acid other than dialkyl L-tartrate was used as the scavenger, had a lowered rubber removal rate compared with the Examples.

Thus, it was confirmed that when the transition metal compound represented by Formula 5-1 according to the present invention or the transition metal compound represented by Formula 6-1 according to the present invention was added together with dialkyl L-tartrate, the rubber removal rate was significantly improved even when a small amount of the transition metal compound was used.

The invention claimed is:

1. A catalyst composition comprising: dialkyl L-tartrate; and one or more selected from the group consisting of a transition metal compound represented by the following Formula 1 and a transition metal compound represented by the following Formula 3:

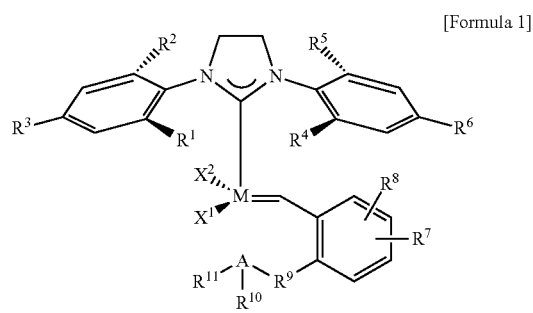

[Formula 1]

wherein

M is ruthenium or osmium,

A is oxygen (O), nitrogen (N), or sulfur (S), and if A is oxygen (O) or sulfur (S), $R^{11}$ does not exist, $X^1$ and $X^2$ are each independently halogen, $R^1$, $R^2$, $R^3$, $R^4$, $R^5$, and $R^6$ are each independently hydrogen or an alkyl group having 1 to 10 carbon atoms, $R^7$ and $R^8$ are each independently hydrogen or an electron withdrawing group, $R^9$ is a direct bond or an alkylene group having 1 to 10 carbon atoms, and $R^{10}$ and $R^{11}$ are each independently an alkyl group having 1 to 10 carbon atoms or a substituent represented by the following Formula 2,

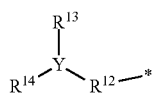

[Formula 2]

wherein

Y is oxygen (O), nitrogen (N), or sulfur (S), and if Y is oxygen (O) or sulfur (S), $R^{14}$ does not exist, $R^{12}$ is an alkylene group having 1 to 10 carbon atoms, a cycloalkylene group having 3 to 10 carbon atoms, or an arylene group having 6 to 10 carbon atoms, $R^{13}$ and $R^{14}$ are each independently hydrogen, an alkyl group having 1 to 10 carbon atoms, or a cycloalkyl group having 3 to 10 carbon atoms, and

* represents a bonding position with A,

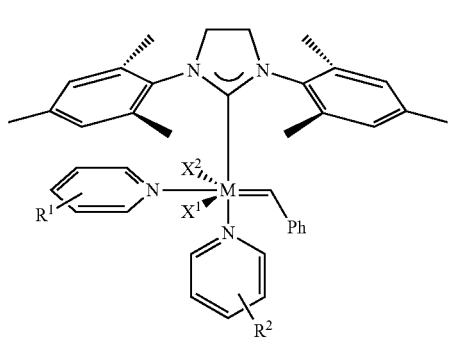

[Formula 3]

wherein

M is ruthenium or osmium, $R^1$ and $R^2$ are each independently hydrogen or a substituent represented by the following Formula 4, and at least one of $R^1$ or $R^2$ is a substituent represented by the following Formula 4, $X^1$ and $X^2$ are each independently halogen, and Ph is a phenyl group, and

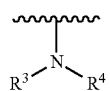

[Formula 4]

wherein $R^3$ and $R^4$ are each independently an alkyl group having 1 to 10 carbon atoms; or $R^3$ and $R^4$ are linked together, and with N to which they are attached to form a saturated or unsaturated 5-membered ring.

2. The catalyst composition of claim 1, wherein the transition metal compound represented by Formula 1 is a transition metal compound represented by the following Formula 5:

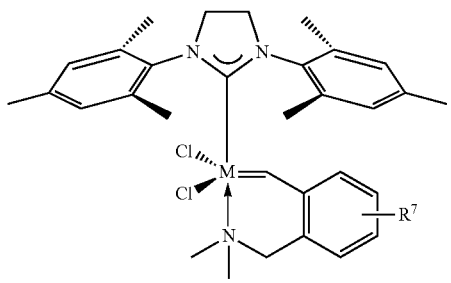

[Formula 5]

wherein

M and $R^7$ are each as defined in claim 1.

3. The catalyst composition of claim 1, wherein the transition metal compound represented by Formula 1 is a transition metal compound represented by the following Formula 5-1:

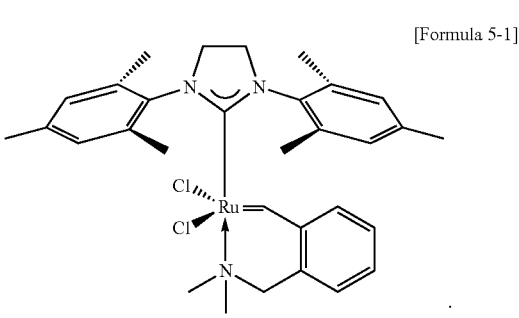

[Formula 5-1]

4. The catalyst composition of claim 1, wherein the transition metal compound represented by Formula 3 is a transition metal compound represented by the following Formula 6:

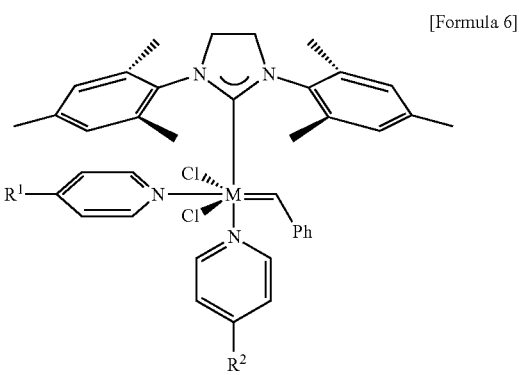

[Formula 6]

wherein

M, $R^1$, and $R^2$ are each as defined in claim 1.

5. The catalyst composition of claim 1, wherein the transition metal compound represented by Formula 3 is a transition metal compound represented by the following Formula 6-1:

[Formula 6-1]

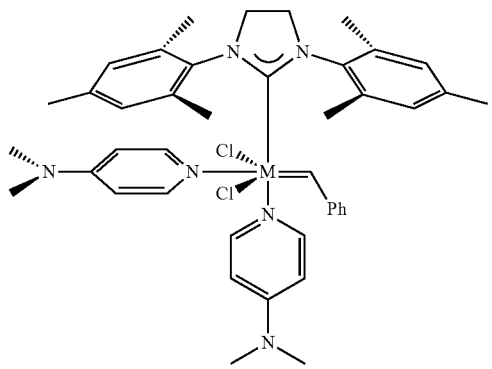

wherein

M is ruthenium.

6. The catalyst composition of claim 1, wherein the dialkyl L-tartrate is one or more selected from the group consisting of diethyl L-tartrate and dibutyl L-tartrate.

7. The catalyst composition of claim 1, wherein the dialkyl L-tartrate is included in an amount of 1 to 25 equivalents relative to 1 equivalent of one or more selected from the group consisting of the transition metal compound represented by Formula 1 and the transition metal compound represented by Formula 3.

8. A method of cleaning a polymerization apparatus, the method comprising: a step of injecting the catalyst composition of claim 1 into a polymerization apparatus containing a diene-based polymer, and a step of performing an olefin cross metathesis.

9. The method of claim 8, further comprising, before the olefin cross metathesis step, a step of swelling the diene-based polymer in the polymerization apparatus with a hydrocarbon-based solvent.

10. The method of claim 9, further comprising, before the swelling step or the olefin cross metathesis step, a step of preparing the diene-based polymer in the presence of a catalyst system by polymerization in the polymerization apparatus, wherein the catalyst system contains a rare earth metal compound and an organoaluminum compound.

11. The method of claim 8, wherein one or more monomers selected from the group consisting of an olefin-based monomer, a conjugated diene-based monomer, and an aromatic vinyl-based monomer are further injected to perform the olefin cross metathesis of the diene-based polymer.

12. The method of claim 8, wherein the olefin cross metathesis of the diene-based polymer is performed at a temperature of 60° C. or more.

13. The method of claim 8, wherein the diene-based polymer is one selected from the group consisting of butadiene rubber, isoprene rubber, styrene-butadiene rubber, and styrene-butadiene-styrene block copolymer.

14. The method of claim 8, where the one or more selected from the group consisting of a transition metal compound represented by Formula 1 and a transition metal compound represented by Formula 3 is included in an amount of 0.001 to 1 part by weight per 100 parts by weight of the diene-based polymer.

* * * * *